Sept. 9, 1924.
M. GOLDSMITH
COMBINED VANITY AND CAMERA CASE
Filed April 7, 1924
1,507,915
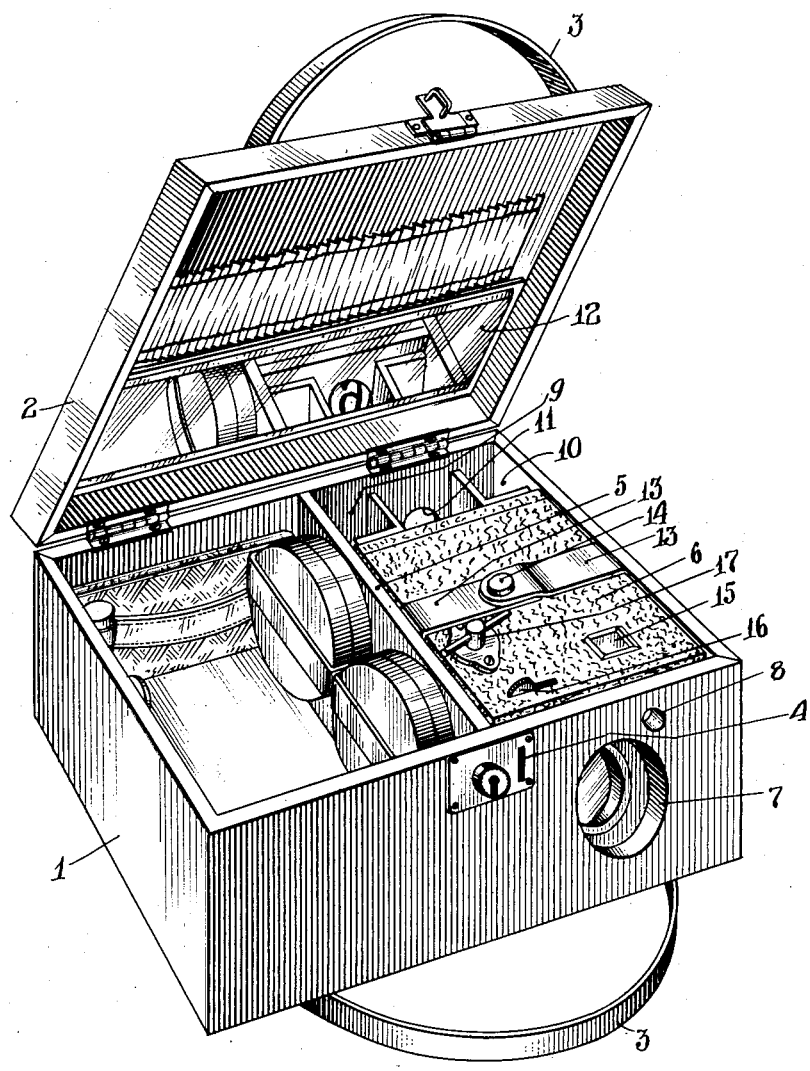

Patented Sept. 9, 1924.

1,507,915

UNITED STATES PATENT OFFICE.

MAURICE GOLDSMITH, OF NEW YORK, N. Y.

COMBINED VANITY AND CAMERA CASE.

Application filed April 7, 1924. Serial No. 704,721.

*To all whom it may concern:*

Be it known that I, MAURICE GOLDSMITH, a citizen of the United States, residing at New York city, in the county of New York and State of New York, have invented certain new and useful Improvements in Combined Vanity and Camera Cases, of which the following is a specification.

My invention is a combined vanity box and camera case and it is my object to construct a case in which the camera can be secured and used to take photographs without removing it from the case, or, if desired, the camera may be removed from the case and used in the usual manner. A further object is the provision of means whereby the film numbers may be seen without removing the camera from the case.

The drawing is a perspective view of my improved case, with the lid opened.

The case comprises a body 1 with a lid 2 hinged thereto and is provided with carrying handles 3 and a catch 4.

A partition 5 divides the body of the box into two compartments, one of which forms the vanity box proper and the other of which forms the camera case.

The camera 6 is of the roll film fixed focus type and is set down into the camera compartment with its lens opposite an aperture 7 in the body 1 and its finder opposite another aperture 8 in the body 1.

At the rear of the camera compartment are two pockets 9 and 10 for the storage of extra rolls of film with the rear wall of the box exposed between them. This rear wall may have a peep hole 11 through which the numbers printed on the roll film in the camera can be read without removing the camera from the case.

The inside of the lid 2 of the case carries a mirror 12 which can be used as the ordinary mirror in a vanity case but it also serves to reflect the film number in the rear of the camera so that by merely looking at the mirror the user can wind over the proper amount of film.

Straps 13—13 provided with a snap fastener may be used to secure the camera in the compartment.

By combining the camera and vanity box but one article need be carried instead of, as at present, carrying the camera and vanity case separately. By not making the camera an integral part of the vanity case it may be removed and used separately and can be removed and used after the vanity case is discarded.

To take a picture the lid of the case is raised, the object located on the finder 15, the shutter released by the button 16 after which fresh film is wound into place by the key 17, the mirror showing when it has been turned far enough. All these operations may be performed without attracting attention and pictures obtained under adverse conditions.

I claim:—

1. A combined vanity case and camera enclosure comprising a body and a lid hinged thereto, means in the body for securing a camera therein, an aperture in one wall of the body adapted to aline with a camera lens and a mirror secured to the inside of the lid, and adapted to reflect the rear of a camera whereby the exposure numbers may be read.

2. A combined vanity case and camera enclosure comprising a body and a lid hinged thereto, a partition in the body dividing it into a vanity box and a camera compartment, apertures in the wall of the body adapted to aline with a camera lens and a camera finder, film compartments in the camera compartment in the rear corners thereof and a mirror secured to the inside of the lid and adapted to reflect the rear of a camera whereby the exposure numbers may be read.

3. A combined vanity case and camera enclosure comprising a body and a lid hinged thereto, a partition in the body dividing it into a vanity box and camera compartment, apertures in the wall of the body adapted to aline with a camera lens and a camera finder another aperture in the wall of the body through which film numbers in a camera back may be seen, and a mirror secured to the inside of the lid and adapted to reflect the rear of a camera whereby the exposure numbers may be read.

In testimony whereof I have affixed my signature.

MAURICE GOLDSMITH.